(12) United States Patent
Gacoin et al.

(10) Patent No.: US 11,794,746 B2
(45) Date of Patent: Oct. 24, 2023

(54) METHOD FOR ENSURING THAT A VEHICLE CAN SAFELY PASS A TRAFFIC LIGHT

(71) Applicants: RENAULT s.a.s., Boulogne-Billancourt (FR); NISSAN MOTOR CO., LTD., Yokohama (JP)

(72) Inventors: Nicolas Gacoin, Guyancourt (FR); Christophe Tricaud, Pacy sur Eure (FR)

(73) Assignees: RENAULT s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 45 days.

(21) Appl. No.: 17/428,119

(22) PCT Filed: Mar. 18, 2020

(86) PCT No.: PCT/EP2020/057366
§ 371 (c)(1),
(2) Date: Aug. 3, 2021

(87) PCT Pub. No.: WO2020/193295
PCT Pub. Date: Oct. 1, 2020

(65) Prior Publication Data
US 2022/0055624 A1    Feb. 24, 2022

(30) Foreign Application Priority Data
Mar. 25, 2019   (FR) ...................................... 19 03039

(51) Int. Cl.
*B60W 30/18* (2012.01)
*G06V 20/58* (2022.01)
(Continued)

(52) U.S. Cl.
CPC .... *B60W 30/18154* (2013.01); *B60W 30/181* (2013.01); *B60W 30/18159* (2020.02);
(Continued)

(58) Field of Classification Search
CPC .. B60W 10/04; B60W 10/18; B60W 2420/42; B60W 2552/00;
(Continued)

(56) References Cited

U.S. PATENT DOCUMENTS

| | | | | |
|---|---|---|---|---|
| 6,629,515 | B1 * | 10/2003 | Yamamoto | ............. B60K 6/543 |
| | | | | 307/10.6 |
| 8,185,296 | B2 * | 5/2012 | Yokoyama | ....... G08G 1/096783 |
| | | | | 701/119 |

(Continued)

FOREIGN PATENT DOCUMENTS

| | | | |
|---|---|---|---|
| DE | 10 2012 219 922 A1 | 5/2013 | |
| DE | 11 2013 007 046 T5 | 1/2016 | |
| EP | 3660809 B1 * | 1/2022 | ................ B60T 7/12 |

OTHER PUBLICATIONS

International Search Report dated Jul. 9, 2020 in PCT/EP2020/057366 filed on Mar. 18, 2020, 2 pages.

*Primary Examiner* — Babar Sarwar
(74) *Attorney, Agent, or Firm* — Oblon, McClelland, Maier & Neustadt, L.L.P.

(57) ABSTRACT

A method ensures that a vehicle can safely pass a traffic light. The vehicle includes a processor and a light sensor. The method includes receiving traffic data, establishing a speed profile, establishing a control distance, the processor establishing, in accordance with the speed profile, a control distance at which braking ensures that the vehicle stops safely before the position of the traffic light, adjustment according to the speed profile, detecting the state of the traffic light when the vehicle is at the control distance from (Continued)

the traffic light, and the processor activating braking if the traffic light is red.

8 Claims, 4 Drawing Sheets

(51) Int. Cl.
  *B60W 50/00* (2006.01)
  *G08G 1/0967* (2006.01)
  *B60W 10/04* (2006.01)
  *B60W 10/18* (2012.01)

(52) U.S. Cl.
  CPC ....... *B60W 50/0097* (2013.01); *G06V 20/584* (2022.01); *G08G 1/096725* (2013.01); *G08G 1/096783* (2013.01); *B60W 10/04* (2013.01); *B60W 10/18* (2013.01); *B60W 2420/42* (2013.01); *B60W 2554/802* (2020.02); *B60W 2555/60* (2020.02); *B60W 2556/45* (2020.02); *B60W 2710/18* (2013.01); *B60W 2720/103* (2013.01)

(58) Field of Classification Search
  CPC ....... B60W 2554/802; B60W 2555/60; B60W 2556/45; B60W 2556/50; B60W 2710/18; B60W 2720/103; B60W 30/14; B60W 30/181; B60W 30/18154; B60W 30/18159; B60W 50/0097; B60W 60/0021; G06V 20/582; G06V 20/584; G08G 1/09623; G08G 1/096725; G08G 1/096741; G08G 1/09675; G08G 1/096783
  See application file for complete search history.

(56) References Cited

U.S. PATENT DOCUMENTS

| | | | |
|---|---|---|---|
| 8,786,421 B2* | 7/2014 | Dozza | B60Q 1/44 340/901 |
| 9,108,629 B2* | 8/2015 | Otake | B60L 15/2009 |
| 9,321,447 B2* | 4/2016 | Abuelsaad | B60W 10/06 |
| 9,437,110 B2* | 9/2016 | Otake | G08G 1/096741 |
| 9,550,498 B2* | 1/2017 | Meyer | G06V 20/56 |
| 9,938,908 B2* | 4/2018 | Li | F02D 41/1406 |
| 10,654,488 B2* | 5/2020 | Chow | B60W 10/06 |
| 10,675,986 B2* | 6/2020 | Sano | G08G 1/096758 |
| 10,922,971 B2* | 2/2021 | Maeda | G08G 1/096783 |
| 10,953,756 B2* | 3/2021 | Bryan | B60L 53/00 |
| 11,113,550 B2* | 9/2021 | Zeisler | G08G 1/095 |
| 11,143,156 B2* | 10/2021 | Chae | G05D 1/0088 |
| 11,433,861 B2* | 9/2022 | Kakeshita | B60T 7/22 |
| 2009/0076698 A1* | 3/2009 | Yokoyama | B60W 40/04 701/70 |
| 2013/0110316 A1 | 5/2013 | Ogawa | |
| 2014/0046509 A1 | 2/2014 | Otake | |
| 2015/0183433 A1* | 7/2015 | Suzuki | B60W 10/06 701/96 |
| 2016/0075330 A1 | 3/2016 | Oguri | |
| 2017/0015203 A1* | 1/2017 | Oguri | B60L 50/62 |
| 2017/0015328 A1* | 1/2017 | Oguri | B60W 50/14 |
| 2017/0120923 A1 | 5/2017 | Rovik et al. | |
| 2017/0124869 A1* | 5/2017 | Popple | G08G 1/087 |
| 2017/0243481 A1* | 8/2017 | Neubecker | G08G 1/096716 |
| 2018/0141461 A1* | 5/2018 | Sano | B60L 15/2009 |
| 2018/0186352 A1* | 7/2018 | Goto | B60T 8/17 |
| 2020/0026284 A1* | 1/2020 | Hiramatsu | G01C 21/36 |
| 2020/0193819 A1* | 6/2020 | Ma | G08G 1/08 |

* cited by examiner

METHOD FOR ENSURING THAT A VEHICLE CAN SAFELY PASS A TRAFFIC LIGHT

BACKGROUND

The invention relates to the field of the devices and methods that aim to improve vehicle traffic flow on roads.

From the state of the art, traffic services are known that aim to assist a driver in crossing a traffic light in the go state, by communicating an optimal speed to be adopted. The driver then adopts said optimal speed, which allows him or her to arrive at the traffic light in the go state, without him or her having to stop.

Such traffic services allow road traffic to flow freely, provide savings in transport time, reductions in energy cost and environmental impact, and enhanced road safety.

When the vehicle is situated at a predetermined distance from the traffic light, for example 500 meters, the traffic service transmits to the vehicle the state of the traffic light to the vehicle and the optimal speed to be adopted.

A driver using such a traffic service is an active driver of the vehicle. He or she can adapt the speed of his or her vehicle according to the recommended speed, but can also decide to slow down, accelerate or brake depending on his or her feeling and the situation. If, on approaching the traffic light, the state of the traffic light does not conform to the prediction made by the traffic service, the driver can react appropriately to avoid infringing the rules of the highway code.

The state of a traffic light may not conform to the prediction for example following a change in the pacing of the traffic lights of a crossroads to allow a priority vehicle or a public transport vehicle such as a bus, a tram or a train, to cross.

The state of a traffic light may not conform to the prediction following a fault, maintenance, a failure or a disturbance of the traffic service.

In the case of an onboard driver assistance system, and in which the driver is much more passive because the vehicle itself regulates its speed on approaching a traffic light, it is up to the vehicle to react appropriately if the state of the traffic light does not conform to the prediction made by an algorithm internal to the vehicle.

The state of the art does not describe such an onboard safety system.

BRIEF SUMMARY

The invention relates to a method for ensuring that a vehicle can safely cross a traffic light, the vehicle comprising a computer capable of determining a distance between the vehicle and said traffic light, a speed regulator, and a light sensor capable of detecting the state of said traffic light out of a stop state and a go state, the method comprising the following steps:
- a step of reception of traffic data, in which the computer receives traffic data transmitted from an external device, the traffic data comprising a time of change of state of said traffic light, for a change from the stop state to the go state, the computer further determining a current distance between the vehicle and the traffic light substantially at the moment of reception of the data,
- a step of determination of a speed profile, in which the computer determines, as a function of the time of change of state and of the current distance, a speed profile to be adopted by the vehicle according to the distance from the vehicle to the traffic light, for the vehicle to cross the traffic light in the go state, without the vehicle stopping,
- a step of determination of a control distance, in which the computer determines, as a function of the speed profile, a control distance at which a dynamic braking of the vehicle guarantees a safe and comfortable stopping of the vehicle, before the position of said traffic light,
- a regulation step in which the speed regulator regulates the speed of the vehicle as a function of the distance from the vehicle to the traffic light, according to the speed profile,
- a step of detection of the state of the traffic light, in which the light sensor determines the state of said traffic light when the vehicle is at a distance from the traffic light equal to the control distance,
- a decision step, in which the computer activates a dynamic braking of the vehicle if the traffic light is in the stop state, and in which the computer lets the speed regulator regulate the speed of the vehicle according to the speed profile, if the traffic light is in the go state.

According to one aspect of the invention, the speed profile comprises a speed level over which the speed is constant and equal to a crossing speed, in meters per second, the speed level extending over a distance in meters, greater than a value corresponding to said crossing speed multiplied by a level time lying between one second and three seconds.

According to one aspect of the invention, the crossing speed lies between 7 meters per second and 20 meters per second.

According to one aspect of the invention, the control distance is a function of a predetermined braking deceleration lying between 2.5 meters per second squared and 4 meters per second squared.

According to one aspect of the invention, the control distance is equal to the crossing speed squared, divided by twice the braking deceleration.

According to one aspect of the invention, the light sensor comprises a vision device such as a camera, and a classifier capable of distinguishing a traffic light in the go state from a traffic light in the stop state, on a shot taken by said vision device.

The invention also relates to a computer program product comprising the program instructions implementing at least one step of the method, when the program instructions are executed by a computer.

BRIEF DESCRIPTION OF THE DRAWINGS

Other advantages and features of the invention will become apparent on reading the description and the drawings.

DETAILED DESCRIPTION

Figure 1:
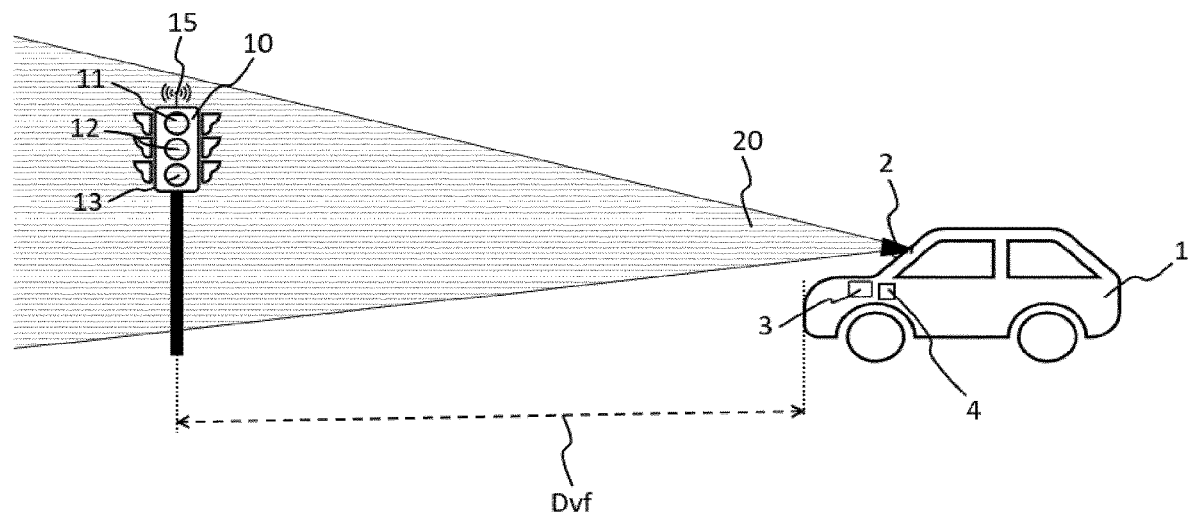
FIG. 1 schematically represents a vehicle approaching a traffic light.

FIG. 1 represents a vehicle 1 comprising a computer 4, a speed regulator 3 and a light sensor 2.

The light sensor 2 is capable of detecting the state of a traffic light 10 out of a stop state and a go state.

A go state of the traffic light 10 indicates to a driver of the vehicle 1 that he or she can cross the traffic light 10, the traffic lane on which the vehicle 1 is situated being open.

A stop state of the traffic light 10 indicates to the driver of the vehicle 1 that he or she must stop at the traffic light 10, without crossing it, the traffic lane on which the vehicle 1 is situated being closed beyond the traffic light 10.

The light sensor 2 advantageously comprises a vision device, preferably a front-mounted camera, located on a central rear-view mirror of the vehicle 1. The light sensor 2 can comprise another type of vision device, such as a LIDAR. The light sensor 2 can be located at another point, for example on the roof of the vehicle 1.

The light sensor 2 comprises a field of view 20 capable of covering an environment of the vehicle 1 comprising traffic lights, for example over a distance of at least 100 meters.

The light sensor 2 further comprises a classifier capable of distinguishing a traffic light in the go state from a traffic light in the stop state, on a shot taken by the vision device. A shot can be a raw, reconstituted or touched up image, or a pseudo-image constructed from digital data.

The computer 4 is capable of receiving traffic data transmitted by an external device such as server or the traffic light 10.

The traffic light 10 of FIG. 1 comprises a transmitter 15 capable of transmitting traffic data to a receiver of the computer 4 of the vehicle 1.

The traffic data comprise a time of change of state of the traffic light 10, for a change from the stop state to the go state.

More generically, the traffic data comprise a time of change of state of the traffic light 10 and a current state of the traffic light 10.

A time of change of state of the traffic light 10 associated with a current stop state of the traffic light 10 corresponds to a time of change of state of the traffic light 10, for a change from the stop state to the go state.

A time of change of state of the traffic light 10 associated with a current go state of the traffic light 10 corresponds to a time of change of state of the traffic light 10, for a change from the go state to the stop state.

In FIG. 1, the vehicle 1 is located at a distance Dvf from the traffic light 10.

The traffic light 10 is in the field of view 20 of the light sensor 2 of the vehicle 1. The light sensor 2 is capable of detecting the state of the traffic light 10.

The computer 4 is capable of determining the distance Dvf between the vehicle 1 and the traffic light 10, for example using a camera or geolocation data.

The transmitter 15 of the traffic light 10 sends traffic data to the computer 4 of the vehicle 1, the traffic data comprising a time of change of state of the traffic light 10, for a change from the stop state to the go state. The computer 4 is capable of determining, as a function of the distance Dvf between the vehicle 1 and the traffic light 10, a speed profile allowing the traffic light 10 to be crossed, without the vehicle stopping.

The computer 4 is capable of controlling the speed regulator 3 according to said speed profile which is a function of the distance Dvf between the vehicle 1 and the traffic light 10.

The speed regulator 3 manages the speed V of the vehicle without the intervention of the driver of the vehicle 1. The driver is passive with respect to the management of the speed V of the vehicle 1.

The traffic light 10 is, for example, a three-color light comprising a red light 11, a green light 13 and an orange light 12. This example is not limiting, the traffic light being able to be a two-color or four-color light.

Figure 2A:
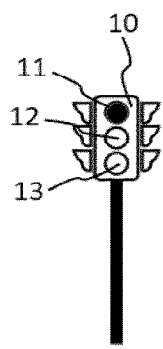
FIG. 2a represents a traffic light in a stop state.

When the red light 11 is on, as represented in FIG. 2a, the traffic light 10 is in the stop state.

Figure 2B:
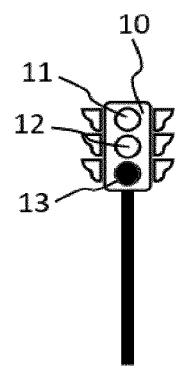
FIG. 2b represents a traffic light in a go state.

When the green light 13 is on, as represented in FIG. 2b, the traffic light 10 is in the go state.

Figure 2C:
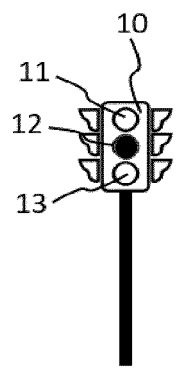
FIG. 2c represents a traffic light in an intermediate state.

In FIG. 2c, the orange light 12 is on, the traffic light 10 is in an intermediate state. The intermediate state can be a state of transition between the go state and the stop state and/or between the stop state and the go state, to indicate to a driver the imminent change of state of the light from the go state to the stop state and/or from the stop state to the go state.

The intermediate state of a traffic light 10 can also indicate to the driver a failure of said traffic light 10, for example when the orange light 12 is on intermittently, that is to say when the orange light 12 is flashing.

A traffic light 10 within the meaning of the invention can comprise a go state and a stop state which are not notified by a light being switched on, but, for example, by the movement of a barrier between two distinct positions, or a change of pictogram.

Figure 3:
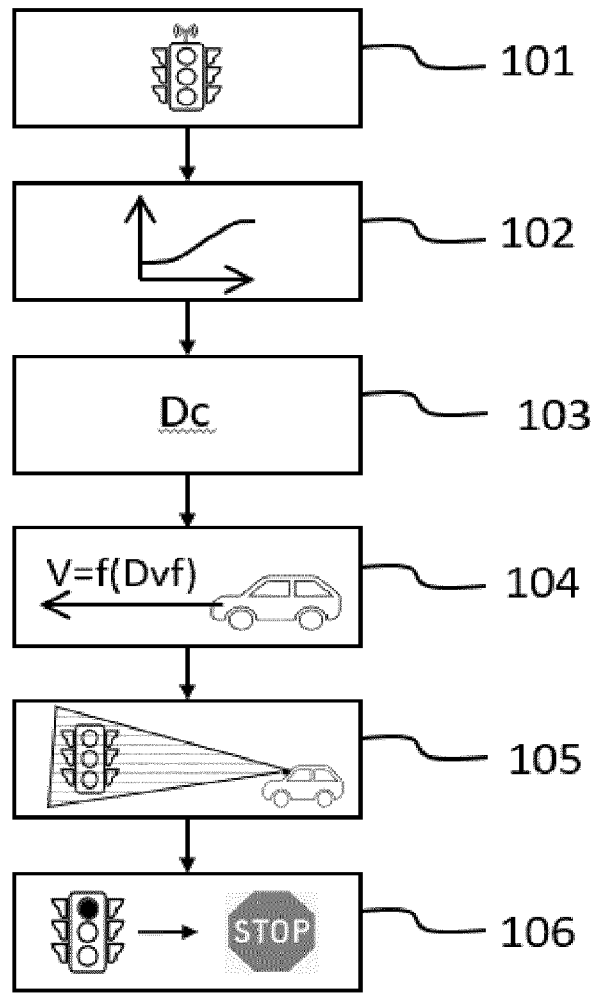
FIG. 3 schematically represents the steps of the method according to the invention.

FIG. 3 schematically represents the steps of the method according to the invention.

According to a step of reception of traffic data 101, the computer 4 receives traffic data transmitted from an external device, for example from the transmitter 15 of the traffic light 10, the traffic data comprising a time of change of state of a traffic light 10, for a change from the stop state to the go state. The computer 4 determines a current distance Dvfc between the vehicle 1 and the traffic light 10 substantially at the moment of reception of the traffic data.

The computer 4 receives traffic data transmitted from an external device for example when the vehicle 1 is at a distance from the traffic light 10 less than five hundred meters.

In the case where the traffic data are transmitted continuously, the computer 4 takes them into account when the vehicle 1 is at a distance from the traffic light less than five hundred meters.

The computer 4 is capable of determining the current distance Dvfc between the vehicle 1 and the traffic light 10, for example from geolocation data of the vehicle 1 and a mapping comprising the geographic position of the traffic lights.

According to one alternative, the traffic data can comprise the coordinates of the traffic light 10 more easily allowing the computer 4 to determine the current distance Dvfc between the vehicle 1 and the traffic light 10.

The current distance Dvfc between the vehicle 1 and the traffic light 10 can also be determined using a sensor such as a camera, a LIDAR or a radar.

According to a step of determination of a speed profile 102, the computer 4 determines, as a function of the time of change of state and of the current distance Dvfc, a speed profile to be adopted by the vehicle 1 according to the distance Dvf from the vehicle 1 to the traffic light 10, for the vehicle 1 to cross the traffic light 10 in the go state, without the vehicle 1 stopping.

For example, the speed profile comprises a deceleration, then a constant speed level of a duration of a few seconds.

According to a step of determination of a control distance 103, the computer 4 determines, as a function of the previously determined speed profile 50, a control distance Dc at which a dynamic braking of the vehicle 1 guarantees a safe and comfortable stopping of the vehicle 1, before the position of said traffic light 10.

Unlike an emergency braking which can cause discomfort and a jolting of the driver through an excessively abrupt deceleration of the vehicle, the dynamic braking corresponds to a braking deceleration of the vehicle lying between 2.5 meters per second squared and 4 meters per second squared.

According to a regulation step 104, the speed regulator 3 regulates the speed of the vehicle 1 as a function of the distance Dvf from the vehicle 1 to the traffic light 10, according to the speed profile.

Thus, the vehicle 1 travels toward the traffic light 10 at a speed V, following the speed profile, the driver not needing to use either the accelerator pedal or the brake pedal of the vehicle 1. The speed regulator 3 follows the speed profile for which, at a distance Dvf between the vehicle 1 and the traffic light 10, there corresponds a predetermined speed V of the vehicle 1.

When the distance Dvf from the vehicle 1 to the traffic light 10 is equal to the control distance Dc, the light sensor 2 determines the state of said traffic light 10 according to a step of detection of the state of the traffic light 105.

According to a decision step 106, the computer 4 activates a dynamic braking of the vehicle 1 if the traffic light 10 is in the stop state. If the traffic light 10 is in the go state, the computer 4 lets the speed regulator 3 regulate the speed V of the vehicle 1 according to the speed profile.

The traffic light 10 can further comprise an intermediate state as illustrated in FIG. 2c.

Preferentially, if the light sensor 2 determines that the traffic light 10 is in the intermediate state according to the step of detection of the state of the traffic light 105, then the computer 4 activates a dynamic braking of the vehicle 1, according to the decision step 106.

Figure 4:
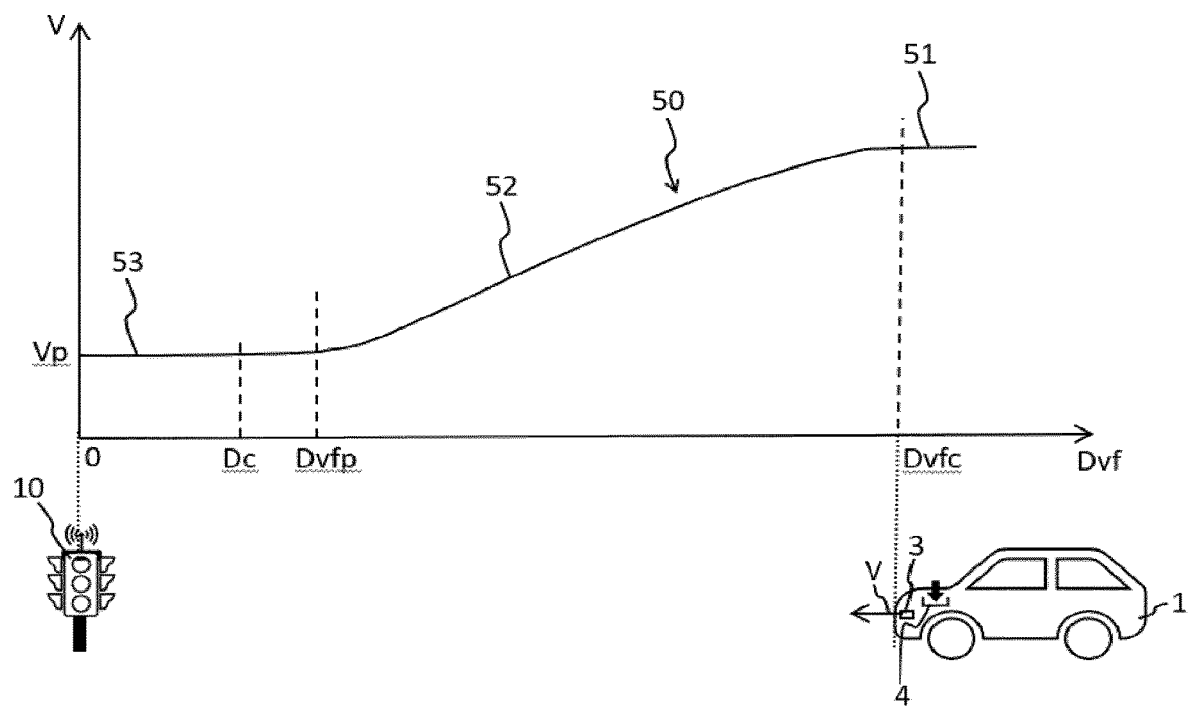
FIG. 4 represents a speed profile as a function of the distance from the vehicle to the traffic light.

FIG. 4 illustrates an example of speed profile 50 for the realization of the invention.

The X axis shows the distance Dvf between the vehicle 1 and the traffic light 10. The origin corresponds to the position of the vehicle 1 at the traffic light 10, the distance Dvf between the vehicle 1 and the traffic light 10 then being zero. The Y axis shows the speed V of the vehicle 1.

Beyond the current distance Dvfc, the speed V is, for example, constant, as illustrated on the part of curve representing the speed V of the vehicle 1 as a function of the distance Dvf between the vehicle 1 and the traffic light 10.

The speed profile 50 comprises a deceleration phase 52 which extends on the X axis between the current distance Dvfc and a level distance Dvfp. During this deceleration phase 52, the deceleration of the vehicle 1 for example lies, over most of the curve, between 0.5 meters per second squared and 1 meter per second squared, in particular far from the abscissae corresponding to the level distance Dvfp and the current distance Dvfc.

The speed profile 50 advantageously comprises a speed level 53 over which the speed is substantially constant and equal to a crossing speed Vp, in meters per second.

The speed level 53 extends over a level distance Dvfp in meters, from the vehicle 1 to the traffic light 2, greater than a value corresponding to said crossing speed Vp multiplied by a level time lying between one second and three seconds.

Preferably, the crossing speed Vp lies between 7 meters per second and 20 meters per second.

For example, for a crossing speed Vp equal to 10 meters per second and a level time of 2 seconds, the speed level extends at least over a level distance Dvfp from the vehicle 1 to the traffic light 2 equal to 20 meters and of which the origin is situated at the traffic light 10.

Advantageously, the control distance Dc is equal to the crossing speed Vp squared, divided by twice the braking deceleration.

For a braking deceleration of the vehicle equal to 3 meters per second squared and a crossing speed Vp equal to 10 meters, the control distance is equal to 16.7 meters.

For a speed level extending over a level distance Dvfp of 20 meters, the speed V of the vehicle 1 is already stabilized at the crossing speed Vp, upon the execution of the step of detection of the state of the traffic light 105, by the light sensor 2.

The invention claimed is:

1. A method for ensuring that a vehicle can safely cross a traffic light, the vehicle comprising a computer configured to determine a distance between the vehicle and said traffic light, a speed regulator, and a light sensor configured to detect a state of said traffic light out of a stop state and a go state, the method comprising:

receiving traffic data, in which the computer receives the traffic data transmitted from an external device, the traffic data comprising a time of change of state of said traffic light, for a change from the stop state to the go state, the computer further determining a current distance between the vehicle and the traffic light substantially at the moment of reception of the traffic data, determining a speed profile, in which the computer determines, as a function of the time of change of state and of the current distance, the speed profile to be adopted by the vehicle according to the distance from the vehicle to the traffic light, for the vehicle to cross the traffic light in the go state, without the vehicle stopping, determining a control distance, in which the computer determines, as a function of the speed profile, the control distance at which a dynamic braking of the vehicle guarantees a safe and comfortable stopping of the vehicle, before a position of said traffic light, regulating, in which the speed regulator regulates a speed of the vehicle as a function of the distance from the vehicle to the traffic light, according to the speed profile, detecting the state of the traffic light, in which the light sensor determines the state of said traffic light when the vehicle is at a distance from the traffic light equal to the control distance, and deciding, in which the computer activates a dynamic braking of the vehicle when the traffic light is in the stop state, and in which the computer lets the speed regulator regulate the speed of the vehicle according to the speed profile, when the traffic light is in the go state.

2. The method as claimed in claim 1, wherein the speed profile comprises a speed level over which the speed is constant and equal to a crossing speed, in meters per second, the speed level extending over a distance in meters, greater than a value corresponding to said crossing speed multiplied by a level time lying between one second and three seconds.

3. The method as claimed in claim 2, wherein the crossing speed is between 7 meters per second and 20 meters per second.

4. The method as claimed in claim 3, wherein the control distance is a function of a predetermined braking deceleration of between 2.5 meters per second squared and 4 meters per second squared.

5. The method as claimed in claim 4, wherein the control distance is equal to the crossing speed squared, divided by twice the predetermined braking deceleration.

6. The method as claimed in claim 1, wherein the light sensor comprises a vision device and a classifier configured to distinguish a traffic light in the go state from a traffic light in the stop state, on a shot taken by said vision device.

7. The method as claimed in claim 6, wherein the vision device is a camera.

8. A non-transitory computer readable medium storing a computer program that, executed by a computer, cause the computer to execute the method as claimed in claim 1.

* * * * *